United States Patent Office 3,672,797
Patented June 27, 1972

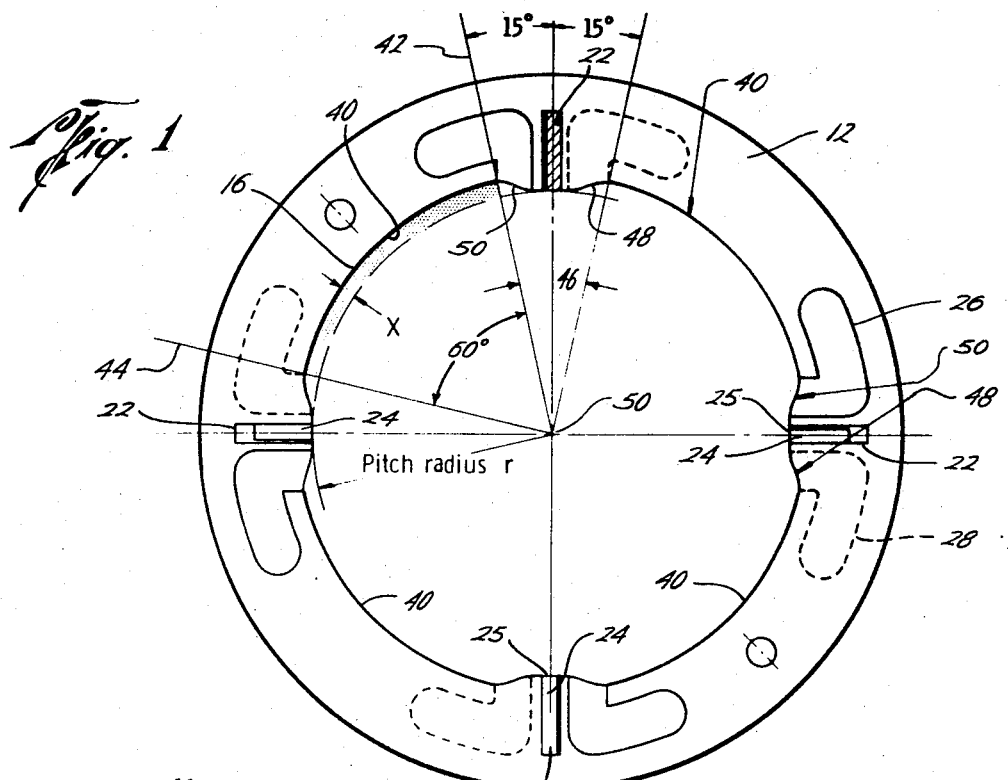
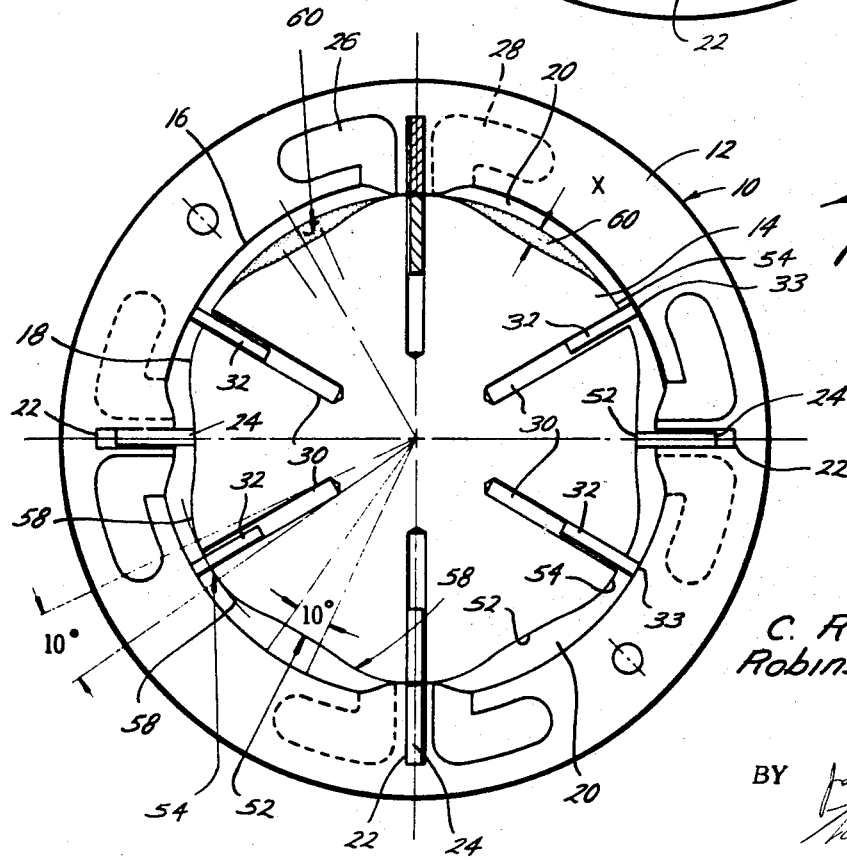

3,672,797
FLUID POWER CONVERTER
Charles R. Gerlach and Robinson W. Brown, San
Antonio, Tex., assignors to Gerlach Brown, Inc.
Filed Dec. 10, 1969, Ser. No. 883,692
Int. Cl. F01c *1/00;* F03c *3/00;* F04c *1/00*
U.S. Cl. 418—125                          11 Claims

ABSTRACT OF THE DISCLOSURE

A fluid power converter, such as a hydraulic fluid pump or motor, having a rotor and stator each having sealing valves, which provides a zero radial bearing load by providing more valves in the rotor member than in the stator, with the excess of rotor valves being at least two when the stator contains an even number of valves, and with the number of rotor valves being twice the number of stator valves when the stator contains an odd number of valves. The stator having a contoured periphery to provide a plurality of annular spaces between the rotor and stator, each space defined in part by an arc of a circle having its center coaxial with the axis of the rotor and stator and having an angular width such that a constant net torque is exerted on both rotor valves and stator valves to provide zero torque fluctuation. Both the rotor and stator having opposed contoured perpheries cooperating to provide an annular space therebetween in which the stator and rotor peripheries include a plurality of recesses defined in part by an arc of a circle having its center coaxially with the axis of the rotor and stator and of an angular width such that a constant net torque is exerted on both rotor valves and stator valves to provide zero torque fluctuation.

BACKGROUND OF THE INVENTION

Generally, hydraulic motors and pumps having valve elements on both the rotor and stator are old as shown in Pat. No. 2,992,616. However, prior art hydraulic motors and pumps have been subjected to running torque fluctuations and radial bearing load fluctuations. The present invention is directed to an improved fluid power converter which provides a zero radial bearing load design, and in which the perpheries of the stator, and in some cases rotor, are contoured to provide a zero torque fluctuation design and a maximum fluid displacement and thus maximum power output for a given converter size.

SUMMARY

One feature of the present invention is to provide a fluid power converter having a rotor member and a stator member which are concentrically mounted and rotatable one to the other and each of which have peripheries including a plurality of equally spaced axially extending slots for receiving a valve therein and providing more valves in the rotor than in the stator, with the excess of rotor valves being at least two when the stator contains an even number of valves, and with the number of rotor valves being twice the number of stator valves when the stator contains an odd number of valves thereby providing a zero radial bearing load design and allowing a zero torque fluctuation design.

Another feature of the present invention is a fluid power converter in which the stator and rotor members have opposed contoured peripheries cooperating to provide an annular space therebetween in which at least one of the stator and rotor members has a periphery which includes a plurality of recesses defined partly by an arc of a circle having its center coaxial with the center of the rotor and stator thereby providing a zero torque fluctuation design and at the same time maximizing the fluid displacement and thus the power output to be obtained with a given rotor pitch diameter.

Still another feature is the provision of a fluid converter in which the stator and rotor have opposed contoured peripheries cooperating to provide an annular space therebetween in which the stator has a periphery which includes a plurality of recesses defined partly by an arc of a circle having its center coaxial with the center of the rotor and stator and of an angular width equal to 360 degrees divided by the number of rotor valves.

Still another feature is the provision of a fluid converter in which the stator and rotor have opposed contoured peripheries cooperating to provide an annular space therebetween in which the rotor has a periphery which includes a plurality of recesses defined partly by an arc of a circle having its center coaxial with the center of the rotor and stator and having rotor sections subtending the rotor valves partly defined by an arc of a circle having its center coaxial with the center of the rotor and stator and the angular periphery width of the rotor recesses being equal to the angular periphery width of the rotor sections subtending the rotor valves.

Another feature of the present invention is the provision of recesses in the opposing peripheries of the stator and rotor in which the angular width of the recesses are such that a constant net torque is exerted on the sum of the stator valves and on the sum of the rotor valves to provide a constant output torque and balanced radial bearing loads.

BRIEF DESCRIPTION OF THE DRAWING

FIG. 1 is a schematic elevational view, in cross section showing the stator of the fluid converter of the present invention, FIG. 2 is a schematic elevational view, in cross section, illustrating the rotor and stator valving and contours of the present invention.

DESCRIPTION OF THE PREFERRED
EMBODIMENT

Referring now to the drawings, and particularly to FIG. 2, the reference numeral 10 generally indicates a fluid power converter, either gas or hydraulic, of the present invention. While either member of the converter 10 may be designed to be the stator and the other the rotor for purposes of illustration, member 12 may be the stator and member 14 may be the rotor.

In order to obtain a theoretical radial pressure balance and a zero radial bearing load, it is necessary to provide more valves in the rotor member than in the stator, with the excess of rotor values being at least two when the stator contains an even number of valves, and with the number of rotor valves being multiples of the number of stator valves when the stator contains an odd number of valves. Based on these conditions, it is noted that there must be more valves in the rotor member 14 than in the stator member 12 by at least two since the stator of this illustration contains an even number of valves. The stator 12 is shown as including a plurality of radially extending valve receiving slots 22, for purposes of illustration only, here shown as four in number, equally spaced around the stator 12 and each of which receives any suitable type of valving elements, here shown as self-pressurizing loading vanes 24 therein whose outer ends 25 contact the outer periphery 18 of the rotor 14. The inner periphery 16 of the stator 12 and the outer periphery 18 of the rotor 14 are suitably contoured, as will be more fully described hereafter in detail, to provide an annular fluid space 20 therebetween.

Similarly, and referring to FIG. 2, the rotor 14 includes a plurality of equally spaced valve element re-receiving slots 30, here shown as six for purposes of illustration only, each of which receives a valve element such as a vane 32 wherein the outer end 33 of which sealingly engages the inner periphery 16 of the stator 12.

Fluid passageways 26 and 28 are provided on either side of the valve elements 24 in the stator 12 one of which, such as passageway 26 may be a fluid inlet and the other passageway, such as passageway 28, may be a fluid outlet. Thus assuming that the fluid power converter 12 is acting as a motor with fluid coming in the fluid inlet passageway 26 and out of the fluid outlet passageways 28, the rotor 14 will rotate counterclockwise relative to the stator 12.

Referring still to FIGS. 1 and 2, in determining the proper contours of the periphery 16 of the stator 12 and of the periphery 18 of the rotor 14, it is to be noted that a constant torque output may be obtained so long as at least one of the peripheries 16 and 18 includes properly sized and shaped fluid recesses. However, in order to obtain maximum fluid displacement and thus maximum output for a given size, it is desirable that both peripheries 16 and 18 include working recesses. Referring now to FIG. 1, it is noted that the "working" contour of the inner periphery 16 of the stator 12 such as the recess section 40 between radial lines 42 and 44 is the arc of a circle which has its center coaxial with the axis 50 of the rotor 14 and stator 12, thereby providing a contour which maximizes the potential displacement to be obtained for a given size converter 12. All working recess surfaces 40 along the periphery 16 are identical. Obviously, the torque produced by a single rotor vane or valve 32 moving along a constant radius surface 40 from angular position 42 to angular position 44 is constant and equal to:

$$T = Pl\left(rx + \frac{x^2}{2}\right)$$

Where P is the differential pressure,
l the longitudinal length,
r the pitch radius as shown
x the valve displacement as shown In the particular illustration shown in FIGS. 1 and 2, utilizing six valves 32 on the rotor 14 and four valves 24 on the stator 12, the four working recess portions 40 of the inner periphery 16 of the stator 12 have an angular width of 60 degrees and are separated from each other by transition portions 46 which in the present illustration have an angular width of 30 degrees. Thus each recess 40 has an angular width equal to 360 degrees divided by the number of rotor valves. With this particular illustration, it is noted from FIG. 1 that there are always four working rotor valves 32 and two rotor valves 32 undergoing the transition process from exhaust to pressurization during which no work is performed. Thus it is noted that there are always an even number of rotor valves 32 on a working cycle while an even number of rotor valves are on a non-working cycle. The net result is that there is precisely constant torque produced by the rotor vanes 32 riding on the stator periphery or contour 16. It is to be noted that the leading edges 48 and the trailing edge 50 of the transition sections 46 are symmetrical contours and are preferably harmonic contours to minimize the possibility of floating action of the rotor vanes 32. The fluid inlets 26 and outlets 28 are situated at the transition sections 46 with an inlet port on one-side of each stator valve 22, and an outlet port on the other side, so that the porting ideally ends at the beginning of each recess section 40. For a practical design the porting must end a few degrees, say about 2, before the start of each recess section 40.

Referring now to FIG. 2, it is to be noted that preferably the rotor 14 also includes a plurality of recesses 52 spaced equal distance about the outer periphery 18 of the rotor and includes rotor valve sections 54 subtending the rotor valves 32. Preferably the recesses 52, as in the case of the stator recesses, are defined in part by an arc of a circle having its center coaxial with the center 50 of the rotor 14 and stator 12 to maximize the fluid displacement and allow achievement of zero torque fluctuation. The rotor valve sections 54 are also constant radius surfaces defined in part by an arc of a circle having its center at axis 50. The rotor periphery 18 also includes on either side of the rotor valve sections 54 symmetrical, and preferably harmonic, contours 58. It is to be noted that the angular width of the rotor recesses 52 are equal to the angular width of the rotor valve sections 54. For the particular illustration of six rotor valves 32 and four stator valves 24, the rotor valve sections 54 are 10 degrees wide and the rotor recess sections 52 are 10 degrees. It is not necessary that the constant arc sections 52 and 54 be precisely 10 degrees, however, they must be of equal angles. Thus the volume of fluid 60 in dotted outline is the volume swept out by each stator vane 24 as it passes over each recess 52. Because of the shape of the periphery 18 of the rotor 14, it is noted that a theoretically constant torque is achieved by the action of the stator valves 24 acting on the rotor periphery 18 since the sum of all of the stator valve displacements at all times is constant and equivalent to having two of the stator valves at maximum displacement at all rotor angles. That is, assuming that the maximum depth of the rotor recess 52 is $x$ then it is noted that the sum of all stator valve 24 displacements at all times is equal to $2x$ and thus is constant and does not provide adverse torque fluctuations nor undesirable radial bearing loads. While it is indicated in the drawings that the maximum fluid displacement or depth $x$ of the recesses 40 of the stator 12 and recesses 52 of the rotor 14 are equal, this is not necessary. However, it is preferable that the depth of the stator recess 40 and rotor recess 52 be substantially equal so that the acceleration of the vanes 32 on the rotor and 24 on the stator 12 are substantially the same.

Thus it is noted that the particular arrangement and number of valves on the rotor 14 and on the stator 12, and the arrangement of the contours of the inner periphery 16 of the stator 12 and 18 of the rotor 14 provide a fluid motor or pump which theoretically provides a zero torque fluctuation and a zero radial bearing load while at the same time maximizing fluid displacement for a given fluid converter size 10 within the limitations imposed by vane accelerations.

The foregoing preferred embodiment illustrated the converter wherein there was an even number of stator and rotor valves, with the number of rotor valves exceeding the number of stator valves by at least two. By this arrangement, a zero theoretical radial pressure loading design was achieved. Further, by properly contouring at least one of the stator and rotor surfaces as indicated it is possible to achieve a zero torque fluctuation design. The stator 12a includes two stator valves 22a and the rotor 14a includes four rotor valves 32a. This particular embodiment is an exception to the embodiment given in FIGS. 1 and 2 in which either or both of the coacting peripheries 16 of the stator 12 and 18 of the rotor 14 could be contoured. In the embodiment of FIG. 3 a zero torque fluctuation design is obtained wherein the outer periphery 18a of the rotor 14a is circular and only the inner periphery 16a of the stator 12a is contoured. The contouring of the stator periphery 16a is similar to that described in FIGS. 1 and 2 and includes two recesses 40a which are partly defined by the arc of a circle which has its center coaxial with the axis 50a of the rotor 14a and stator 12a. In the embodiment shown in FIG. 3, it is noted that the angular width of the recesses 40a is a little under 180 degrees and the recesses 40a are separated from each other by transition portions 46a, which in the present illustration, have an angular width of less than 90 degrees.

It is possible to achieve zero torque fluctuations in a fluid converter by observing the following limitations. For those converters, such as 10, having an even number of stator valves 22 of at least four in number, and an even number of rotor valves 32 which exceed the number of stator valves 22 by two, either or both the stator 12 and rotor 14, may be contoured to provide the annular space therebetween. If the stator 12 is contoured, its periphery 16 includes a plurality of recesses 40 partly defined by an arc of a circle having its center coaxial with the center 50 of the rotor and stator and with the angular width not less than 360 degrees divided by the number of rotor valves. If the rotor 14 is contoured, it includes a plurality of recesses 52 which are partly defined by arcs of a circle having its center 50 at the axis of the rotor and stator and including valve sections 54 which are partly defined by arcs of a circle having its center 50 at the axis of the rotor and stator with the angular width of the cuicular arcs of the recesses 52 equal to the angular width of the rotor valve sections 54.

The present invention, therefore, is well adapted to carry out the objects and attain the ends and adavntages mentioned as well as others inherent therein.

What is claimed is:

1. In a fluid power converter having a rotor member and a stator member, the members being concentrically mounted and rotatable one with respect to the other about a common center, said members having opposing peripheries on opposite sides of a common pitch radius, said stator periphery including a plurality of equispaced axially extending slots opening at said pitch radius and receiving a valve therein, a fluid inlet in the stator adjacent one side of each slot therein, a fluid outlet in the stator adjacent the second side of each slot therein, said rotor further having peripherally spaced means sealingly engaging said stator periphery during rotation of the rotor, the improvement comprising, there being more said spaced means along the rotor periphery than said valves along the stator periphery, the stator periphery including a plurality of surface portions defined by arcs of circles having their centers coaxial with said common center, said rotor periphery including a plurality of recesses and having a plurality of arcs of circles, some of said arcs of circles defined by said spaced means at substantially said pitch radius and others defining portions of said recesses at a radius different from said pitch radius, all of said arcs of circles of said rotor periphery having their centers coaxial with said common center, the angular periphery width of each rotor recess portion defined by an arc of a circle being substantially equal to the angular periphery width of each rotor spaced means, and each said rotor recess comprising one of said recess portions and substantially symmetrical contoured surfaces extending on opposite sides of said recess portion thereof to adjacent ones of said arcs of circles at substantially said pitch radius.

2. The improvement of claim 1 wherein said stator periphery is contoured away from said common pitch radius, said surface portions defined by arcs of circles of said stator periphery each having a radius different from said pitch radius and each extending peripherally from a fluid inlet to a fluid outlet.

3. The improvement of claim 2 wherein each of said surface portions of said stator periphery subtends an angle substantially equal to the angle between adjacent peripherally spaced means in said rotor periphery.

4. In a fluid power converter having a rotor member and a stator member, the members being concentrically mounted and rotatable one with respect to the other about a common center, said members having opposing peripheries contoured inwardly and outwardly respectively from a common pitch radius to provide an annular space therebetween, each of said peripheries including a plurality of equispaced axially extending slots opening at said pitch radius and receiving a valve therein, a fluid inlet in the stator adjacent one side of each slot therein and opening into the annular space, a fluid outlet in the stator adjacent the second side of each slot therein and opening into the annular space, the improvement comprising, there being more valves in the rotor member than in the stator member, the stator periphery including a plurality of recesses defined by arcs of circles having their centers coaxial with said common center, said recesses each having a radius different from said pitch radius and each extending peripherally substantially from a fluid inlet to a fluid outlet, said rotor periphery including a plurality of recesses and having a plurality of arcs of circles, some of said arcs of circles defining valve sections at substantially said pitch radius which receive said rotor slots and other defining portions of said recesses at a radius different from said pitch radius, all of said arcs of circles of said rotor periphery having their centers coaxial with said common center, the angular periphery width of each rotor recess portion defined by an arc of a circle being substantially equal to the angular periphery width of each rotor valve section, and each said rotor recess comprising one of said recess portions and further defined by substantially symmetrical contoured surfaces extending on opposite sides of said recess portion thereof to adjacent ones of said arcs of circles at substantially said pitch radius.

5. The apparatus of claim 4 wherein the angular periphery width of the stator recesses defined by said arcs of a circle is equal to 360 degrees divided by the number of rotor valves.

6. The apparatus of claim 4 wherein said arcs of circles defining recesses in said stator periphery are disposed each at a first radius and said arcs of circles defining recesses in said rotor periphery are disposed each at a second radius from said common center.

7. The apparatus of claim 4 wherein the arcs of circles defining the stator recesses are spaced outwardly from said pitch radius by a distance equal to the distance from said pitch radius of the arcs of circles defining said rotor recesses.

8. The apparatus of claim 4 wherein the rotary periphery width of the arc of a circle defining each said stator recess subtends an angle substantially equal to 360 degrees divided by the number of rotor valves, an even number of rotor valves adapted to contact said arcs of circles of said stator periphery at all rotary positions of said rotor relative to said stator while an even number of rotor valves adapted to contact portions of said stator periphery other than said arcs of circles at all rotary positions of said rotor relative to said stator.

9. The apparatus of claim 4 wherein said arcs of a circle defining said stator recesses are separated from said slots of said stator by periphery portions which have harmonic contours.

10. The apparatus of claim 9 wherein said fluid inlets and fluid outlets of said stator open through said periphery portions which have harmonic contours.

11. The apparatus of claim 4 wherein said substantially symmetrical contoured surface portions of said rotor recesses have harmonic contours.

(References on following page)

References Cited

UNITED STATES PATENTS

| | | | |
|---|---|---|---|
| 129,830 | 7/1872 | Jones | 418—221 |
| 2,845,872 | 8/1958 | Farron et al. | 418—150 |
| 415,456 | 11/1889 | Harris | 418—251 |
| 868,841 | 10/1907 | Calkins | 418—266 X |
| 1,320,679 | 11/1919 | Eidson et al. | 418—267 X |
| 1,775,375 | 9/1930 | Springsteen | 418—177 |
| 3,016,020 | 1/1962 | Rineer | 418—175 X |
| 3,016,021 | 1/1962 | Rineer | 418—221 |
| 3,160,147 | 12/1964 | Hanson | 418—221 X |

FOREIGN PATENTS

| | | | |
|---|---|---|---|
| 339,470 | 4/1936 | Italy | 418—221 |
| 1,289,391 | 2/1962 | France | 418—127 |

CARLTON R. CROYLE, Primary Examiner

J. J. VRABLIK, Assistant Examiner

U.S. Cl. X.R.

418—175, 177, 221